United States Patent
Stone et al.

(10) Patent No.: US 6,453,970 B1
(45) Date of Patent: Sep. 24, 2002

(54) ERGONOMIC TOOL FOR ADHESIVE APPLICATIONS

(75) Inventors: Charles L Stone; Barbara J Stone, both of Metamora, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 34 days.

(21) Appl. No.: 09/660,661

(22) Filed: Sep. 13, 2000

(51) Int. Cl.[7] .............................................. B32B 31/20
(52) U.S. Cl. ....................... 156/579; 15/245; 15/245.1
(58) Field of Search ................................ 15/1.52, 97.3, 15/145, 245, 245.1; 156/579; D32/40, 41, 46, 52

(56) References Cited

U.S. PATENT DOCUMENTS

| | | | |
|---|---|---|---|
| 4,097,951 A | 7/1978 | Hurtt ............................. 15/104 |
| 4,469,550 A | 9/1984 | O'Steen, Jr. ................. 156/584 |
| 5,101,530 A | * 4/1992 | Hansen et al. ................. 15/245 |
| 5,246,519 A | 9/1993 | McCormick ................. 156/247 |
| 5,321,868 A | 6/1994 | Coulson et al. ............. 15/245.1 |
| 5,441,185 A | 8/1995 | Dragos ......................... 224/151 |
| 5,660,632 A | 8/1997 | Volpe, Jr. et al. ........... 118/213 |
| 5,695,011 A | 12/1997 | Daniels ........................ 172/381 |
| 5,814,173 A | 9/1998 | Stone ............................. 156/71 |
| 5,865,945 A | 2/1999 | McConaughy ............... 156/579 |
| 5,964,451 A | 10/1999 | Sudheimer ................... 254/132 |

\* cited by examiner

*Primary Examiner*—Richard Crispino
*Assistant Examiner*—George R. Koch, III
(74) *Attorney, Agent, or Firm*—Ralph E. Smith

(57) ABSTRACT

A pressure adhesive film backed automotive vehicle exterior body panel decal applicator tool for applying a decal to a planar and/or non-planar surface of an automotive vehicle external body panel is provided. The tool includes an applicator blade having two blade edge portions formed on opposite longitudinal edges. The blade has a central portion including a pair of parallel spaced-apart protrusions and a valley between the spaced-apart protrusions, the valley having a generally flat portion with a first thickness. A handle is provided by a polymeric tubular member having a wall thickness between 3 and 6 mm with a slot of a second thickness which is one-half or less of the first thickness. The slot has opposing edge walls and at an extreme end the slot has an axially expanding tapered opening to receive the blade valley. The slot edge walls compliantly engage the valley of the blade to retain said blade in a generally fixed position but to also allow limited angular movement of the applicator blade in response to a moment force.

3 Claims, 1 Drawing Sheet

ERGONOMIC TOOL FOR ADHESIVE APPLICATIONS

FIELD OF THE INVENTION

The present invention relates generally to pressure sensitive film applicator tools used for applying decals to a painted surface of an automotive vehicle body panel. More particularly, the present invention relates to a pressure sensitive adhesive film backed decal applicator tool used for applying decals to an automotive vehicle body having enhanced ergonomic characteristics and lower fabrication costs.

BACKGROUND OF THE INVENTION

The outer body panels of most automotive vehicles are painted a solid color. However, there are instances in which markings are added to the outer body panels for stylistic, commercial or informational purposes. For instance, some automotive purchasers desire to apply pinstripes to enhance the appearance of the vehicle. Many automotive vehicle manufacturers wish to attach their trade name or the model name to the vehicle. Additionally, various informational decals may be added to the vehicle, such as that which specifies "unleaded gasoline only" in an area near the gasoline cap. In the past, pinstripes or other styling enhancements were actually painted onto the vehicle body panels. However, this process was not cost efficient. Accordingly, most styling and commercial and informational decals are applied adhesively to the automotive vehicle body panel.

During assembly of the vehicle, an applicator fixture is provided to apply the decal to the vehicle. The decal is placed on a pad or similar part of the applicator fixture. The applicator is aligned with the vehicle body panel. The applicator typically is piston-actuated to provide a predetermined level of force to apply the decal to the vehicle body. The portion of the decal which attaches to the vehicle body typically has a pressure sensitive adhesive film backing. A covering sheet is placed over the film backing on the decal before being shipped to the production facility where an assembler will place the decal in the applicator fixture and then remove the covering sheet. After removal of the covering sheet the fixture is actuated to apply the decal against the vehicle body. The decal also has adhesive on a face side that the lettering or design of the decal is placed onto and which is then covered by a covering sheet. The adhesive on the face side (towards the fixture) will not be as strong as the adhesive on the rear side which places the decal on the vehicle body. Accordingly, the covering sheet on the face side of the decal can easily be removed after the decal is applied on the vehicle body.

In most instances, the fixture will apply the decal to the vehicle body in a satisfactory manner. However, sometimes a portion of the decal will not be properly applied, especially along its edges. If there is an improperly applied decal, an assembly operator will iron out the decal on the vehicle body by utilizing an applicator tool. The applicator tool will be used to apply firm overlapping strokes to remove air bubbles, water or wrinkles and to assure good adhesive contact.

Referring to FIGS. 1 and 2, an automotive vehicle pressure sensitive film decal applicator blade 14 is a specifically designed, polymeric double-edged squeegee-type tool. The applicator blade 14 typically includes a central portion 24 that connects two semi-flexible blade edge portions 17, 19 formed on transversely opposite sides of the central portion 24. The blade edge portions 17, 19 extend longitudinally along the edges of the applicator blade 14. The blade edge portions 17, 19 come to sharpened blade edges 18, 20 at their outermost longitudinal edges. As is known in the art, these sharpened blade edges 18, 20 are used to force out any air bubbles lodged between the pressure sensitive film of the decal and the automotive vehicle body panel by rubbing one of the edges of the applicator blade over an edge of a decal which did not properly set.

The applicator blade 14 also includes a pair of spaced-apart protrusions 28, 32 which extend along the longitudinal length of the central portion 24 parallel to the longitudinal edges 17, 19. Protrusions 28, 32 provide a pair of longitudinal ridges through the central portion 24 of the blade 14 that may be used by the user to grip the applicator tool.

Prior to the present invention, an assembler grasped the central portion of the applicator blade which had no handle, and as the applicator was rubbed against the body panel, the unused sharpened edge typically pressed against the assembler's palm. Although the sharpened edge of the applicator blade was not typically sharp enough to cut a user's hand, repeated use of the applicator blade was often required, potentially causing substantial discomfort to the assembler.

U.S. Pat. No. 5,865,945 disclosed a removable and reusable handle for use with a pressure sensitive film applicator blade. The handle of the prior invention diminished the above-described discomfort to the assembler.

One prior art applicator blade handle included an arrangement for receiving one of the blade edge portions of the applicator tool. Another prior applicator blade handle also included a grip arrangement for gripping the applicator blade and holding the applicator blade within the handle when one of the blade edge portions of the applicator blade was positioned within the receiving arrangement of the handle.

Another prior applicator blade handle had a receiving arrangement with a slot formed into the handle. The slot had a cross-sectional shape configured to slidably receive one of the blade edge portions of the applicator blade. The slot had a mouth including a pair of flanges which were positioned to grip the central portion of the applicator blade between a pair of spaced-apart protrusions thereby acting as the grip arrangement of the handle.

Still another applicator blade handle included a first handle portion and a second handle portion that were fastened together to form the handle. The receiving arrangement included recessed flanges formed into the handle portions in such a way to form a gap between the handle portions when the handle portions were fastened together. The gap had a cross-sectional shape configured to receive one of the blade edge portions of the applicator blade when the handle portions are fastened together around the applicator blade. The flanges were also configured to grip the central portion of the applicator blade between a pair of spaced-apart protrusions on the applicator tool when the handle portions were fastened together around the applicator blade thereby acting as the grip arrangement of the handle.

The prior pressure sensitive film applicator tools functioned well when applying a pressure sensitive film, such as a sign on a substrate, and did provide some ergonomic benefits. However, in the automotive industry, often a decal must be applied to a nonplanar curvilinear surface. The angle of application of the decal to the vehicle surface can vary. Accordingly, to assume maximum ergonomic benefit in the use of an applicator tool, it is desirable that the applicator blade be able to slightly deflect or twist with respect to the handle.

SUMMARY OF THE INVENTION

To make manifest the above noted and other desires, the revelation of the present invention is brought forth. The present invention provides a pressure adhesive film backed automotive vehicle exterior body panel decal applicator tool for applying a decal to a planar and/or non planar surface of an automotive vehicle exterior body panel. The applicator tool in combination includes an applicator blade having two blade edge portions formed on opposite longitudinal edges of the applicator blade. The applicator blade includes a central portion between the two blade edge portions. The central portion includes a pair of spaced-apart protrusions which extend along a longitudinal length of the applicator blade substantially parallel to the longitudinal edges of the applicator blade. The applicator blade's central portion has protrusions on both sides. Between the parallel spaced-apart protrusions there is a valley having a generally flat portion with a first thickness. An extruded polymeric tubular member is provided having a wall thickness between three and six millimeters and a slot with a second thickness which is one-half or less of the first thickness. The slot has opposing edge walls. The slot at an extreme end has an axially expanded tapered opening to receive the applicator blade valley. The applicator blade valley spreads apart opposing edge walls of the slot to cause the tubular member to compliantly engage the applicator blade valley to retain the applicator blade in a generally fixed position while allowing limited angular movement of the applicator blade with respect to the tubular member in response to a moment force engaging the applicator blade. Upon removal of the moment force, the edge walls of the slot return the applicator blade to a generally perpendicular orientation with respect to the tubular member.

It is a feature of the present invention to provide a cost-effective pressure adhesive film backed automotive vehicle exterior body panel decal applicator tool for applying a decal to a planar or non-planar surface of an automotive vehicle exterior body panel.

It is another feature of the present invention to provide a pressure adhesive film backed automotive vehicle exterior body panel decal applicator tool as described above which additionally allows the applicator blade to have limited angular movement with respect to a handle in response to a moment force engaging the applicator blade thereby providing ergonomic benefit to the assembler using such a tool.

Other features of the invention will become more apparent to those skilled in the art upon a reading of the following detailed description and upon reference to the drawings.

DETAILED DESCRIPTION OF THE DRAWINGS

Figure 1:
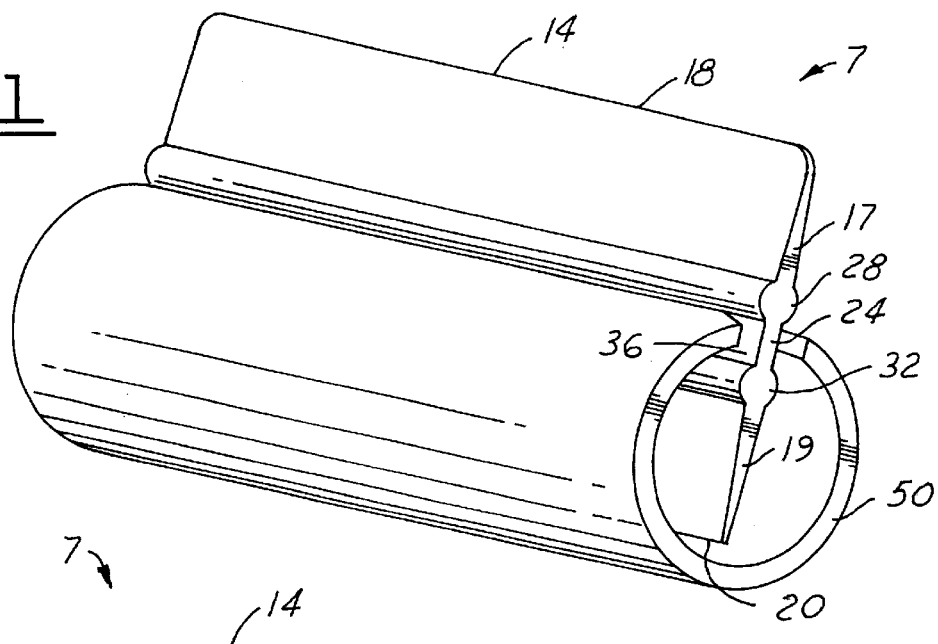
FIG. 1 is a perspective view of a pressure adhesive film backed automotive vehicle exterior body panel decal applicator tool according to the present invention.
Figure 2:
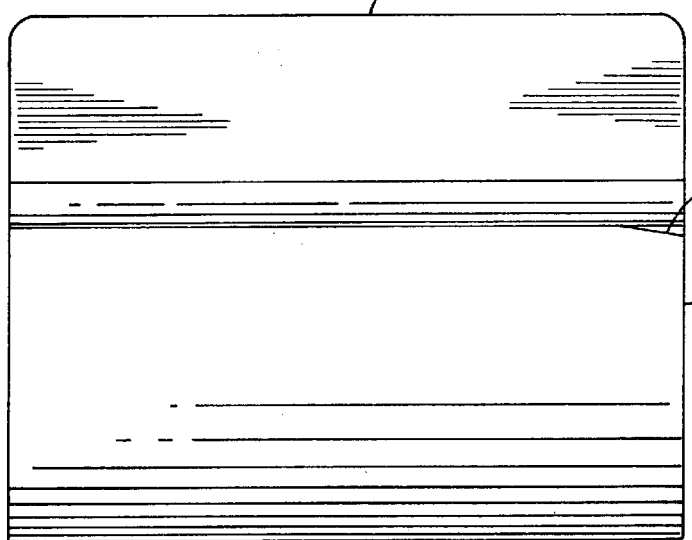
FIG. 2 is a front elevational view of the applicator tool shown in FIG. 1.
Figure 3:
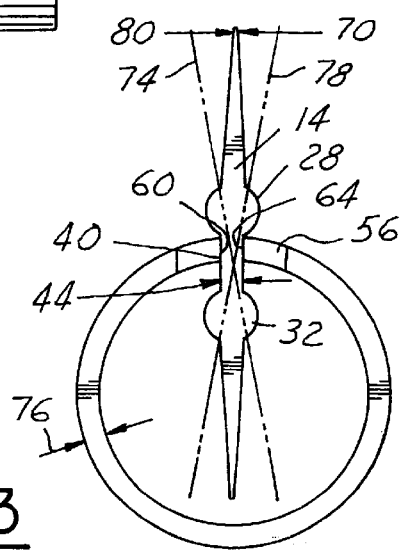
FIG. 3 is a side elevational view of the applicator tool shown in FIGS. 1 and 2.

Referring to FIGS. 1–3, the pressure adhesive film backed automotive vehicle exterior body panel decal applicator tool 7 according to the present invention has an applicator blade 14. The applicator blade has two blade edge portions 17, 19 with blade edges 18, 20 formed on opposite longitudinal edges of the applicator blade 14. The applicator blade 14 includes a central portion 24 which has a pair of parallel spaced-apart protrusions 28, 32. The protrusions 28, 32 extend along the longitudinal length of the central portion 24 of the applicator blade 14 substantially parallel to the longitudinal blade edges 18, 20. The applicator blade central portion 24 has a valley 36 between the spaced-apart protrusions 28, 32. The protrusions 28, 32 project on both sides of the applicator blade 14. The valley 36 has a flat portion 40 with a first thickness 44.

The applicator tool 7 has extruded polymeric tubular member 50 which is typically provided by polyvinyl chloride (PVC) pipe. The tubular member 50 preferably has an outer diameter between 1½ and 2 inches, and as shown has an outer diameter of 1⅞ inches. The tubular member 50 has a wall thickness between 3 and 6 millimeters. The tubular member 50 has a slot with a second thickness which is onehalf or less of the first thickness 44 of the valley 36. The slot proceeds along the total length of the tubular member 50 and at extreme end 52, the slot has an axially expanded tapered opening 56 to receive the applicator blade valley 40 and to wedge apart the opposing edges 60, 64 of the slot. The aforementioned wedging action causes the slot edges 60, 64 to compliantly engage the valley 40 to retain the applicator blade 14 in a generally fixed position. However, the applicator blade 14 is allowed limited angular movement with respect to the tubular member 50 in response to a moment force 70 engaging the applicator blade. Upon the application of the moment force 70 the applicator blade 14 will move to a phantom position as shown by the line 74 (FIG. 3). Upon removal of the moment force 70 the applicator blade 14 will return to a generally perpendicular orientation with respect to the tubular member 50. The length of the flat portion 40 of the valley 36 between the protrusions 28, 32 should be at least 250% greater than the wall thickness 76 of the tubular member 50.

In operation, an assembly operator will grab the tool 7 by the tubular member 50 to provide an ergonomically pleasing handle when manipulating the applicator blade 14. Upon subsequent wear of the blade edge 18, the applicator blade 14 will be removed from the slot and be manipulated to where blade edge 20 is outside of the tubular member 50. The applicator blade 14 will be reinstalled by sliding the valley 36 within the axially expanded tapered opening 56. Especially when using the applicator tool 7 on curvilinear surfaces, a moment force will act upon the blade 14 causing it to have limited angular pivotal movement between the lines 74, 78 in response to a moment force 70 or its opposing moment force 80. To allow the blade 14 to be more responsive, the blade 14 will be moved from the position shown in FIG. 3 wherein the walls of the tubular member 50 are in contact with the protrusion 28, to the extreme opposite position wherein the inner walls of the tubular member 50 will be in contact with the protrusion 32. The above-noted radial adjustment will cause the blade 14 to have a greater angular movement in response to a predetermined moment force. Accordingly, the applicator tool 7 may be radially adjusted for different applications or be adjusted to meet the preferred force relationship of a different vehicle assembler. The radial positional adjustment of the blade 14 can also be made to compensate for less retention in tubular member 50 after prolonged use. One major advantage of the present invention is that the tubular member 50 can be fabricated from standard polymeric tubing and may be easily replaced as required.

While the invention has been described in connection with a preferred embodiment, it will be understood that it is not intended to limit the invention to that particular embodiment. On the contrary, it is endeavored to cover all alternatives, modifications and equivalent as may be included within the spirit and scope of the invention as encompassed by the description and as defined by the appended claims.

We claim:

1. A pressure adhesive film backed automotive vehicle exterior body panel decal applicator tool for applying a decal to a surface of an automotive vehicle external body panel, wherein the applicator tool comprises:

an applicator blade having two blade edge portions formed on opposite longitudinal edges of said applicator blade, said applicator blade including a central portion between said two blade edges portions of the applicator blade, said central portion including a pair of spaced parallel apart protrusions which extend along a longitudinal length of said central portion of said applicator blade substantially parallel to said longitudinal blade edges of said applicator blade, said applicator blade central portion having a valley between said spaced apart protrusions, said protrusions being on both sides of said applicator blade and said valley having a generally flat portion with a first thickness; and an extruded polymeric tubular member having a wall thickness between 3 to 6 mm with a slot of a second thickness which is no greater then half of said first thickless, said slot having opposing edge walls, said slot at an extreme end having an axially expanding tapered opening to receive said applicator blade valley and to wedge apart said opposing edge walls of said slot in said tubular member and cause said slot edge walls of said tubular member to compliantly engage said valley of said applicator blade to retain said applicator blade in a generally fixed position but to allow limited angular movement of said applicator blade with respect to said tubular member in response to a moment force engaging said applicator blade and wherein said edge walls of said slot return said applicator blade to a generally perpendicular orientation with respect to said tubular member upon removal of said moment force and wherein the applicator blade has a central portion wherein said valley flat portion is at least 2½ times in length than said wall thickness of said tubular member and wherein said blade portion can be laterally adjusted wherein alternately one of said protrusions will be contacting with said tubular member to selectively adjust the limited angular movement of said applicator blade with respect to said tubular member in response to a predetermined moment force engaging said applicator blade.

2. The applicator tool of claim 1 wherein said tubular member has an outer diameter between ½ and 2 inches.

3. The applicator tool of claim 1 wherein said polymeric tubular member is fabricated from polyvinyl chloride.

* * * * *